INVENTOR
Siegfried Meurer
BY
Bailey, Stephens & Huettig
ATTORNEYS

United States Patent Office 3,144,006
Patented Aug. 11, 1964

3,144,006
METHOD AND APPARATUS FOR FORMING COMBUSTION GAS MIXTURES FOR ROTARY PISTON ENGINES
Siegfried Meurer, Nurnberg, Germany, assignor to Maschinenfabrik Augsburg-Nurnberg A.G., Nurnberg, Germany
Filed Apr. 21, 1961, Ser. No. 104,621
Claims priority, application Germany Apr. 30, 1960
14 Claims. (Cl. 123—8)

This invention relates to rotary piston internal combustion engines and, in particular, to the formation of the combustion gas mixture for such engines.

This invention is further directed to the compression of the fuel and air mixture and its combustion in rotary or turning piston engines in such a way that the most favorable thermal conditions are produced. In this case, the peculiarities of a rotary piston engine must be taken into account as it is not possible, for example, to raise the compression ratio at will without affecting other important structural dimensions such as those that influence the volume of gas and the engine size. It is especially desirable to keep the maximum gas pressure as low as possible in order to keep the bearing pressures within reasonable values with respect to the large piston surface and the working volume. In order to improve the effective thermal conditions, it is necessary on one hand to raise the compression ratio, while on the other hand to control the engine performance in an even number of turns so that with partial loading the excess of air increases and the mixture ratio becomes leaner, as compared to the Otto-method in which the mixture ratio remains constant or varies only within narrow limits so that it does not fall outside the ignition limit of the combustion gas.

It is known to use the latter kind of solutions as variations in the loading of reciprocating engines. Their effect for the consumption of a partial loading is present in every compression ratio whether high or low. The best consumptions are achieved theoretically between compression ratios which almost correspond to those of fast running reciprocating piston diesel engines. However, in rotary piston engines, one is often interested, for constructional reasons, to not use a compression ratio that is too high and therefor, under certain conditions, dispense with self-ignition without having to give up the advantage of regulating the quality of the combustion gas mixture.

From the manner of forming the combustion gas mixture and the method of burning the mixture in reciprocating piston diesel engines, it is known that it is difficult to guarantee the obtaining of a complete combustion in which, at first and after beginning of the ignition, releases only small quantities of heat together with a low speed in the rise of the gas pressure, while the quantity of heat which is released is raised up to the maximum with each degree of crank shaft rotation to the end of the combustion of the gases and completion of the expansion. Such a combustion, however, is necessary in order to meet the constructional peculiarities of a rotary piston engine. Such is accomplished by this invention. This has been done with the object of avoiding spontaneous self-ignition reactions which are created by the injecton of atomized liquid fuel into hot compressed air and to obtain a gradual mixture of the vaporized fuel with the combustion air. It has been found that, to get a rapid vaporization of the fuel, combustion chamber surfaces whose temperatures are suited to the pecularity of the fuel being used are most desirable. The most favorable temperature for a fuel corresponds to a molecular composition of $C_{16}H_{34}$ is 340° C. Temperatures of this order can be produced on the surfaces of a piston in a rotary piston engine.

According to this invention, the piston is provided with a porous or perforated gas permeable surface which is sprayed with fuel on its side directed away from the combustion chamber or the piston cylinder space. The fuel is distributed under the force of the peripheral acceleration of the rotating piston and on the other hand under the centrifugal forces which are created by the rotating piston and which have the tendency to fling the liquid fuel outwardly in the direction of the piston cylinder space. The porous surface serves to hold the liquid fuel against the centrifugal forces and to ensure that only the vapors formed in the hot surface by reason of the large surface area of the perforations reach outwardly of the piston. Furthermore, since two combustion chambers are created during the rotation of the rotary piston, of which the one leading in the rotation increases in volume from zero to maximum while the one trailing in rotation decreases from maximum to zero, and since both chambers are separated from each other by constriction or saddle point of the trochoid shape of the piston space, there is created a strong air flow at the point of constriction when changing over from one combustion chamber to the other, and the air flow must use the perforations in the porous surface because of the lack of any other connecting channels between the two partial combustion chambers, and when the air passes through this porous surface, an intensive vaporization of the fuel and mixing with the air takes place which is continued with the rotation of the piston beyond that local point. The porous surface in this sense forms a very effective surface vaporizer which is built into the piston and which effects the necessary vaporization and mixing of the fuel. For the successful cold starting of an engine, it is expedient to use a source of ignition for the combustion gas and so a further reduction in the compression ratio may be used. Such source of ignition is either in the form of an electric spark or a hot point, the effectiveness of which can be increased by catalytic means.

The porous surface for enhancing the combustion of the gas is a porous plate composed of a coarse porous material. When using chromoxide or a coating of chromoxide over a body of ceramic material or when other effective metallic materials are used for the porous plate, the reaction process is advantageously influenced with regard to the reaction product as well as the speed of reaction to achieve a high degree of combustion with little waste.

The means by which the objects of the invention are obtained are described with respect to the following drawings which are directed to a two-thirds rotary piston engine, but the principles of which can be applied by analogy to other rotary or turning piston engines constructed in the manner of a trochoid.

Figure 1:
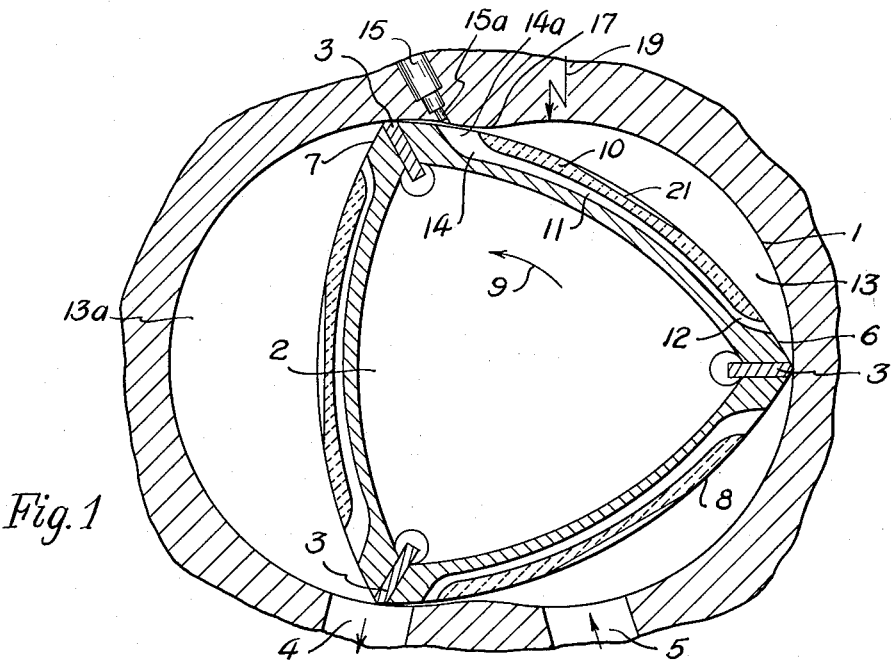
FIGURE 1 is a cross-sectional view through a two-thirds rotary piston engine and showing the section through the porous plates inserted in the surface of the piston.

As shown in FIGURE 1, the cylinder housing 1 has a trochoid shaped piston cylinder space within which piston 2 with sealing strips 3 is rotatably mounted. Exhaust gas port 4 and intake air port 5 communicate with the cylinder space. Piston 2 has three piston head surfaces 6, 7 and 8 which face the cylinder space, with the piston rotating in the direction of the arrow 9. According to this invention, porous piston head surfaces are formed by means of plates 10 inserted in each piston head surface with a channel 11 being formed between the plate 10 and the body of the piston 2. Plates 10 can be composed of a porous sintered material or a porous ceramic body. Also, these plates are preferably formed of a catalytically effective material, for example, a metal oxide, such as a chrome oxide, and at least partially coated with a catalytically effective substance. Channel 11 can increase in size from its trailing end 12 opening into compression chamber 13 toward its leading end 14 which opens through the piston head to receive fuel from the injection nozzle 15. Preferably, the fuel is injected as a solid jet of fuel. The trochoid shaped piston cylinder space is narrowed at its constriction or saddle point 17 which constitutes a sealing means.

Figure 2:
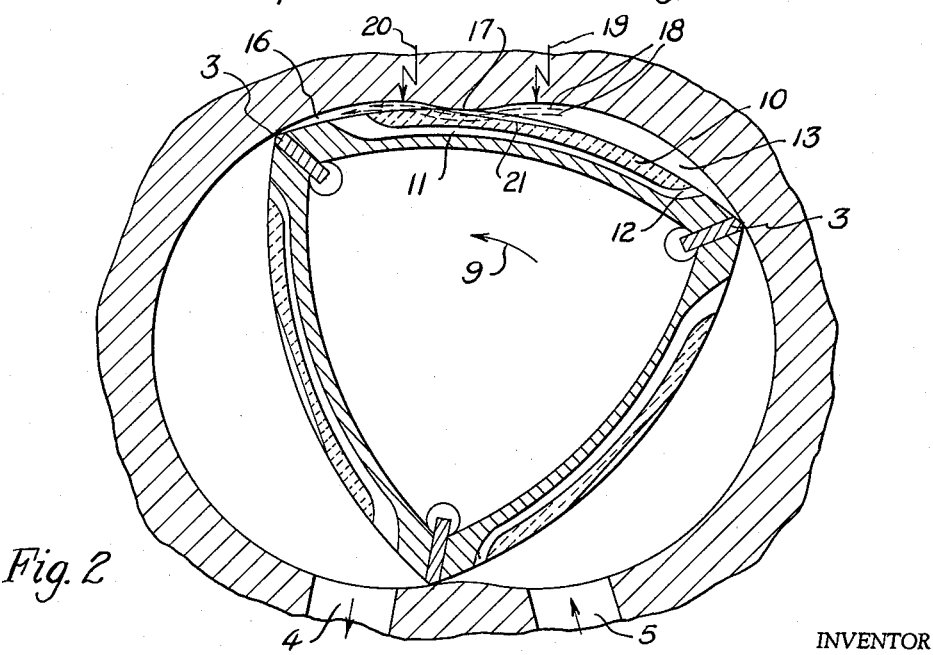
FIGURE 2 is a similar view showing the piston turned to another position.

In FIGURE 2, the leading partial combustion chamber 16 is formed when the piston of FIGURE 1 is rotated counterclockwise. An air flow shown by the arrows 18 is created between chamber 13 and chamber 16. The spark plug or hot point ignition means are indicated by the arrows 19 or 20. The surface of the piston has a slightly flattened portion 21 in the plate 10 for clearing the constriction 17.

Figure 3:
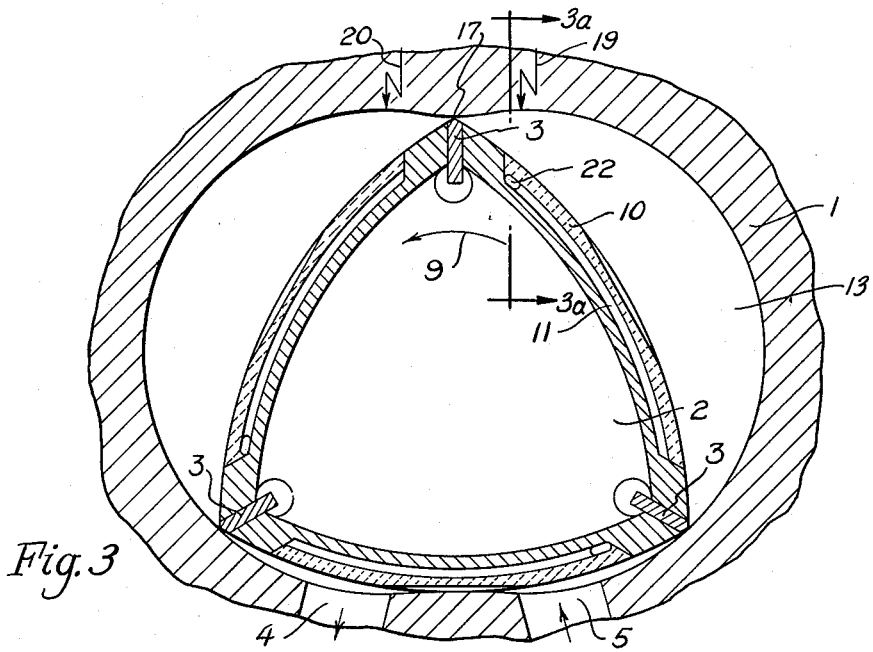
FIGURE 3 is a similar view of a modified form of the invention.

As shown in FIGURE 3, the channel 11 of piston 2 is provided with a port 22 forming an opening through the side of the channel for the introduction of the liquid fuel, this opening being below the outer surface of the plate 10. When sealing strip 3 coincides with saddle point 17, then port 22 is aligned with fuel nozzle 15 mounted in the cylinder housing side wall 2a. Fuel is injected into channel 11 and forced through the porous plate 10 by means of the centrifugal force of the rotating piston. The fuel is vaporized in chamber 13 to be then mixed with air and burned.

Figure 4:
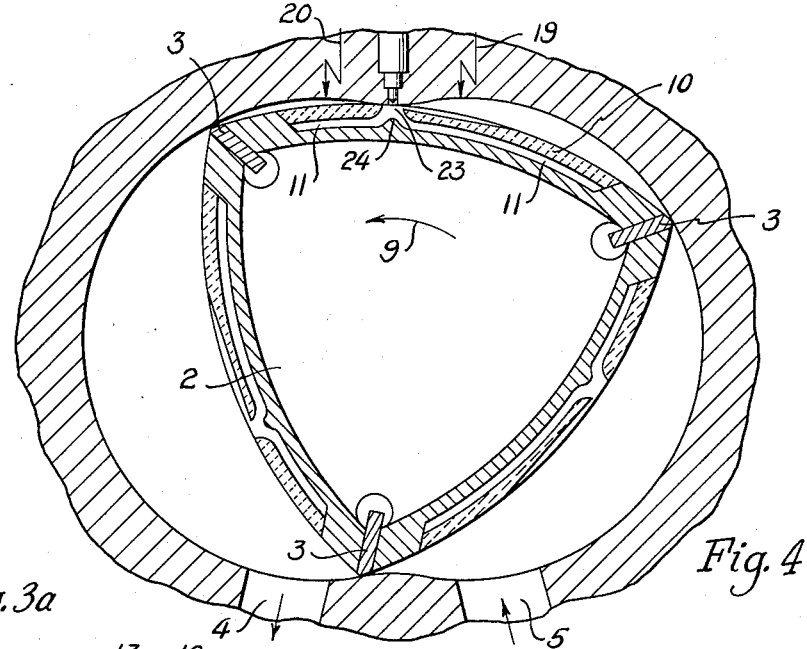
FIGURE 4 is a similar view of a further modified form of the invention.
Figure 3A:
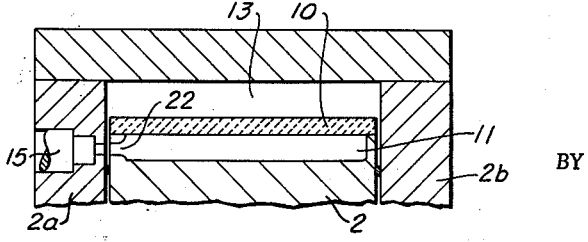
FIGURE 3a is a cross-sectional view taken on the line 3a—3a of FIGURE 3.

In the modification of FIGURE 4, the fuel inlet port 23 extends intermediate the leading and trailing ends of plate 10, the fuel being deposited through port 23 onto a deflecting protuberance 24.

Fuel nozzles for the injection of fuel into a diesel engine ordinarily have the nozzle bore and the nozzle needle arranged within the body of the nozzle. In this invention, in order to be in accord with the peculiarities of a rotating piston engine, the ordinary construction is modified. In this invention, note FIGURE 1, the bore 15a for the injection nozzle is drilled directly through the housing 1 to form the opening into the cylinder space. The nozzle needle for the injection nozzle is mounted in the bore 15a either without any further attachment or, as heretofore, is mounted in a separate nozzle body. This construction has the advantage that the sliding of the sealing strip 3 in the apex of the piston over the bore 15a can take place smoothly and without being deviated by a nozzle body screwed in the housing from the outside.

When the wall of the cylinder contains bores or indentations, the risk exists that, at the moment the sealing strip passes over such bores or indentations, the working gases in the cylinder which are under different pressures on the leading and trailing sides of the sealing strip create strong air currents which lead to the injury of the sealing strip or to difficulties with the bores or indentations. The difference in pressure on opposite sides of the sealing strip is equal to zero or approximately zero when the rotating piston is in certain positions and according to the compression of the working phase in adjacent chambers. Such a piston position is shown approximately in FIGURE 1 in which the chamber 13 is in the state of compression while the chamber 13a is being emptied due to the opening of exhaust port 4. In this phase, the pressure difference at the sealing strip 3 is zero. Consequently, it is understandable that this is the most favorable moment for the sealing strip 3 to pass over a bore or indentation in the wall of the cylinder since at this moment there is no gas motion.

The function of the apparatus of this invention for the forming of a combustion gas mixture is as follows:

In FIGURE 1, when the piston moves in the counterclockwise direction of arrow 9, the air in chamber 13 is being increasingly compressed. The velocity of the sealing strip at this moment is still close to its minimum. When the opening 14a of channel 11 reaches the range of the bore 15a, injection of fuel from the nozzle 15 begins and the fuel moves through the length of channel 11. The solid liquid fuel is injected in the same manner as used in the injection of fuel into reciprocating diesel or Otto engines. The form of the jet and the injection pressure are as required by the particular engine. Because of the velocity of the injected fuel caused by the injection pressure, the fuel tends to run through channel 11 toward the trailing end opening 12. Since the piston turns in the direction of arrow 9, the movement of the fuel toward opening 12 is assisted by the rotation of the piston. Further distribution of the fuel is successfully accomplished by fully using the inertia of the fuel, by reason of which the fuel injection through nozzle 15 is effected with very low pressures and low velocity of fuel injection but with a large cross-sectional area for the jet. By so injecting the fuel, it can be said that in effect the channel 11 is pushed over the injected fuel by the rotation of the piston.

As the piston continues to turn, the fuel takes the velocity of the piston so that it becomes subject to the then applied centrifugal force. Such force drives the fuel through the porous body 10, vaporizes the fuel, and then passes the fuel into the chamber 13. By this means and even with a small radial extension of the wall of the combustion chamber, the fuel is prevented from reaching the cooled wall of the chamber in liquid form.

The further formation of the combustion gas mixture is as follows:

As shown in FIGURE 2, the piston 2 lies immediately before the maximum air compression in chamber 13. Because of the particular trochoid shape of the cylinder space wall, two partial chambers 13 and 16 now exist. A strong air flow is created at the constriction 17 of the trochoid wall since the air is being pushed from chamber 13 which is decreasing in volume into chamber 16 which is increasing in volume. Therefore, the air is forced to flow partially through the porous plate 10 as shown by the arrows 18 so that there is an intensive mixing of the air with the fuel that has been vaporized in the porous plate 10. A part of the fuel is being ejected through the trailing end 12 of channel 11 and due to the centrifugal force is projected from the surface of plate 10 into chamber 13 so that a formation of a gas and fuel mixture also takes place in chamber 13. Burning of the fuel is initiated by the air compression temperature in chamber 13 or by means of another source of ignition 19 so that the movement of the gases through the porous surface 10 and channel 11 continues to increase until combustion begins in chamber 16. Now when a second source of ignition 20 is used whose effect of ignition with regard to time is started before, at the time with, or after that of the ignition source 19, the operation of the gas flow at constriction 17 can be regulated as desired. Upon the further turning of the piston, the porous surface of plate 10 is covered with the combustion mixture forming gas stream along its entire length. The peripheral length between the leading and trailing ends of the surface of plate 10 makes possible a very favorable distribution of the combustion gas mixture in the whole of the elongated combined combustion chambers 13 and 16 and makes it possible to obtain the required slow release of heat as desired. By the flattened portion 21 of the surface of plate 10, the velocities of the air and fuel stream can be varied with regard to time and space and by so doing it is possible to avoid large interior losses due to throttling. The transverse width of the surface of plate 10 in the direction of the axis of the crank shaft can be varied in order to give definite zones of the combustion chamber a supply of more or less fuel. This can be assisted in the shaping of channel 11, especially in its radial and axial directions. The surface area of plate 10 can be composed of a body of heat conductive material, and a coating of heat insulating material on at least a portion of the surface of said body.

Injection of the fuel can also be accomplished as illustrated in FIGURES 3 and 4.

As shown in FIGURE 3, the fuel is injected into channel 11 adjacent the sealing strip and parallel to the axis of the crank shaft and below the outer surface of plate 10. In the position of piston 2 shown in FIGURE 3, the sealing strip is passing through its minimum peripheral velocity. This moment is preferably used for the introduction of the fuel into channel 11 beneath the porous plate 10. In so doing, the fuel can be injected into opening 22 with very little pressure and through the side wall of the housing 1 for the piston cylinder. As the piston turns in the direction of the arrow 9, the fuel is distributed along channel 11 and through plate 10 as heretofore described.

In FIGURE 4, the fuel is introduced intermediate the leading and trailing ends of plate 10. The fuel nozzle is mounted in the constriction of the trochoid wall and an opening 23 in plate 10 serves for introducing the oil into channel 11. The fuel entering through opening 23 is distributed into the channel by impingement on deflecting ridge 24.

Having now described the means by which the objects of the invention are obtained, I claim:

1. In a rotary piston engine having an equilateral arc triangular piston mounted for rotation in a trochoid shaped piston cylinder, said piston having a combustion gas forming structure comprising a gas permeable surface area means on said piston facing into said cylinder, channel means beneath said surface area means, and nozzle means for injecting fuel into said channel means for vaporizing the fuel in conjunction with said surface area means and forcing the vaporized fuel through said surface area means and through said channel means to mix the vaporized fuel and air into the combustion gas.

2. In an engine as in claim 1, said surface area means comprising a body of porous sintered material.

3. In an engine as in claim 1, said surface area means comprising a body composed of a material selected from the class of a catalytically effective metal and a metal oxide, and at least partially coated with a catalytically effective substance.

4. In an engine as in claim 1 said surface area means comprising a body composed of heat conductive material, and a coating of heat insulating material on at least a portion of the surface of said body.

5. In an engine as in claim 1, said surface area means comprising a ceramic body, and at least partially coated with a catalytically effective substance.

6. In an engine as in claim 1, further comprising opening means for the trailing end of said channel means with respect to the direction of the rotation of said piston to establish communication between said channel means and said piston cylinder.

7. In an engine as in claim 1, said nozzle means comprising a nozzle mounted in a cylinder housing adjacent the constriction of the trochoid shaped cylinder and directed against the direction of piston rotation at an angle substantially aligned with the axis of said channel at the time the inlet opening to said channel passes across said nozzle.

8. In an engine as in claim 1, said channel having an inlet opening at its leading end with respect to the direction of the rotation of the piston communicating through a side wall of said piston, and said nozzle means comprising a nozzle positioned in the cylinder space housing at a point where it communicates with said inlet opening when the adjacent apex of said piston is in the range of the constriction of said trochoid shaped cylinder.

9. In an engine as in claim 1, said nozzle means comprising a nozzle positioned in the cylinder housing at the constriction in the trochoid shaped cylinder, and an inlet opening for said channel positioned for receiving fuel from said nozzle shortly before the maximum air compression in said cylinder.

10. In an engine as in claim 1, said engine being a self-ignition engine, and further comprising auxiliary hot ignition means communicating with said cylinder for facilitating ignition of the combustion gas.

11. In an engine as in claim 2, said combustion gas being ignitable by both self-ignition and spark plug means.

12. In an engine as in claim 2, further comprising two sources of ignition for said combustion gas arranged in timed relation with respect to one another.

13. In an engine as in claim 2, said nozzle means including a discharge orifice drilled through the cylinder housing.

14. In an engine as in claim 2, said nozzle means being positioned in said cylinder at a point where the gas pressure on opposite sides of piston apex is at a minimum pressure difference.

No references cited.